April 17, 1934.　　　　S. G. SHORT　　　　1,954,953
COLOR AND OTHER CINEMATOGRAPHY
Filed Aug. 8, 1931　　　4 Sheets-Sheet 1
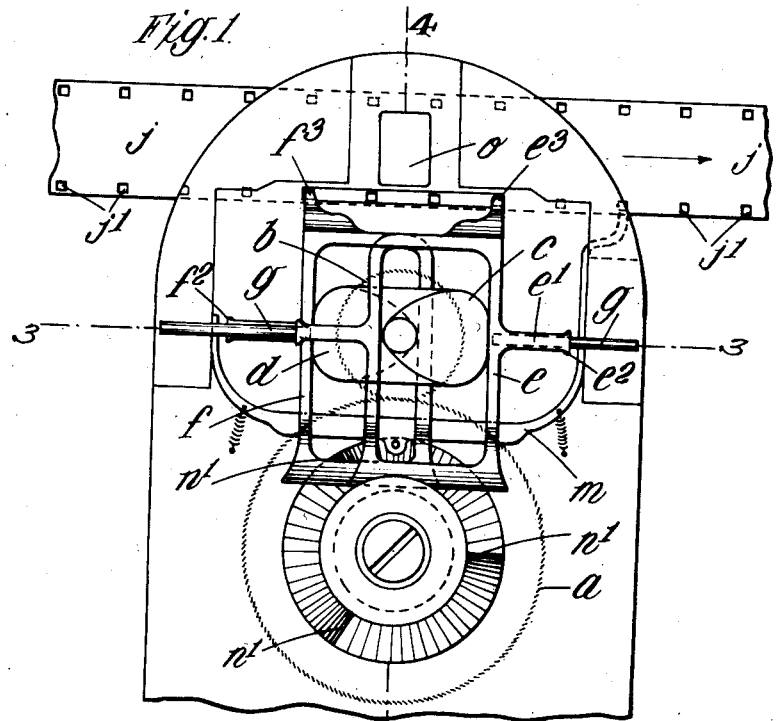
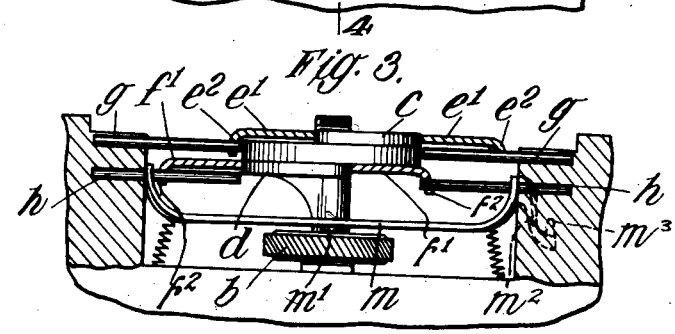
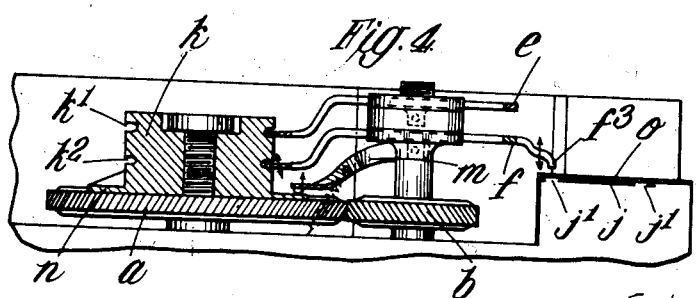
Sydney George Short
INVENTOR

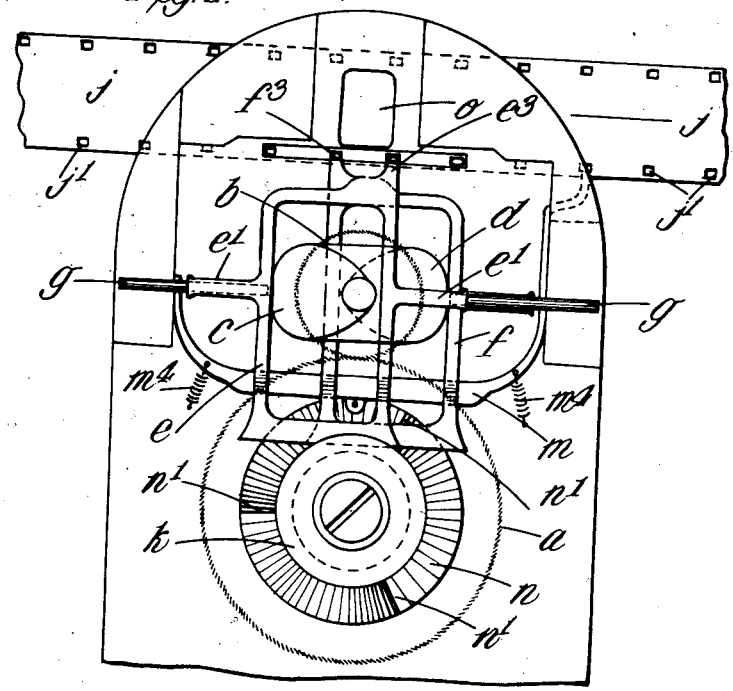
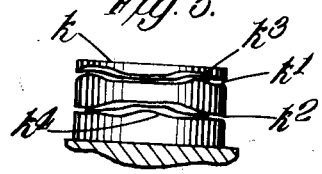
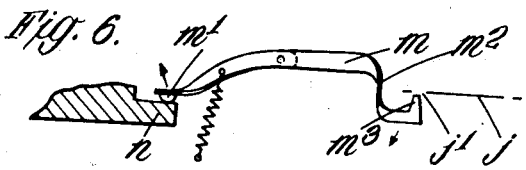
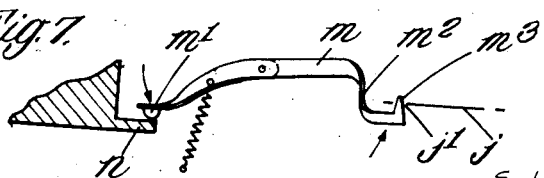

April 17, 1934.    S. G. SHORT    1,954,953
COLOR AND OTHER CINEMATOGRAPHY
Filed Aug. 8, 1931    4 Sheets-Sheet 4

Sydney George Short
INVENTOR

Patented Apr. 17, 1934

1,954,953

UNITED STATES PATENT OFFICE 1,954,953

COLOR OR OTHER CINEMATOGRAPHY

Sydney George Short, Willesden, London, England

Application August 8, 1931, Serial No. 555,914
In Great Britain March 5, 1931

11 Claims. (Cl. 88—16.4)

This invention relates to improvements especially in color cinematography. It is concerned with the elimination of flicker and eye-strain due to insufficiently rapid projection by trebling the rapidity with which the successive pictures are presented to the eye. At the same time it avoids the drawbacks of high-speed taking and projecting, which impose a severe strain upon the camera and projector mechanism and on the film, and in addition demand excessive lighting of the subject in order to secure sufficient exposure in taking.

The avoidance of flicker so necessary for satisfactory projection is normally effected for black and white cinematography by the revolution of a shutter which, by passing before the light a number of times during the exposure of each frame, produces the effect of projecting each frame more than once.

In that system of two color cinematography in which the color-component pictures are taken alternately and are projected alternately on to the screen, the flicker is not entirely eliminated by this device and the rate of alternation between the opposing colors being one half of that of the rate of succession of the pictures, becomes at normal speed projection. slower than can be overcome by persistence of vision, thus causing a very unpleasant flicker. Hitherto it has not been possible to overcome this undesirable result other than by greatly increasing the rate of projection with all its attendant drawbacks.

The present invention, when employing a shutter which normally rotates three times while each picture space or frame is being projected in the normal black and white method of cinematography, utilizes the period of darkness caused by the passage of the shutter before the light to replace each frame after exposure by the one next to it, (the preceding or succeeding frame, by means of an alternately advancing and receding motion, as hereinafter described). This trebles the rate of color alternation on the screen, and thus produces the advantages of high speed projection without its disadvantages. The mean rate of the progress of the film through the projector is entirely normal, and the intermittent and reciprocating motion past the gate does not affect the rate of passage of the film through the projector, nor interfere with sound synchronization in sound-on-film or disc recording, the additional movement being easily absorbed by the loop rendered necessary in all types of projection apparatus by the essentially discontinuous motion of the film. It will be clear that the footage of both negative and positive film required by this invention is normal, the positive conveniently being an ordinary contact print from the negative, which is taken at normal speed.

The projection system according to the present invention is characterized in that the film is moved backwards and forwards in such a manner that each of the color-component images is projected three times, alternating with the opposing color-component images both above and below it, the film feeding mechanism being arranged to advance the film twice (each time exhibiting a single color-component image) then retract the film once, then advance it twice more, then back once and so on.

The complete cycle of movements, i. e. two steps forward and one step backwards, and the corresponding projections are arranged to take place within the period which is normally occupied by the projection of a single picture space in systems as heretofore proposed.

Any suitable claw or other mechanism may be employed to carry out the said movement, but I prefer to employ, in the smaller type of projectors, more particularly the claw mechanism hereinafter described and illustrated in the accompanying drawings.

In order that this invention may be the more clearly understood and readily carried into effect, I will proceed to describe the same with reference to the accompanying drawings which illustrate by way of example and not of limitation one convenient embodiment of this invention, and in which Figure 1 is a plan view of a part of a projector according to the present invention.

Figure 2 is a similar view showing the parts in a different position.

Figure 3 is a section on line 3—3 of Figure 1.

Figure 4 is a section on line 4—4 of Figure 1.

Figure 5 is an elevation of one of the cam members used in the apparatus.

Figure 6 shows that part of the mechanism which is used to locate the film accurately, and Figure 7 shows the said part of the mechanism in a different position.

Figure 9:
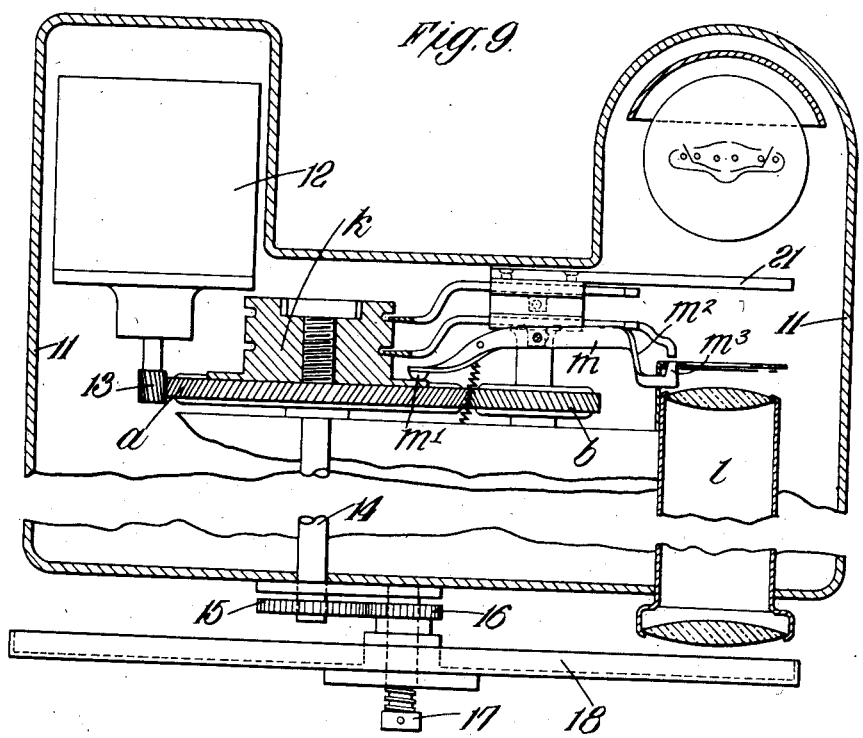
Figure 9 is a sectional plan view of the complete projector.

Referring now to the accompanying drawings, 11 is the projector casing and 12 is the driving mechanism which has been illustrated in Figure 9 as an electric motor, although it will be readily appreciated that any other form of driving mechanism may be used. Fixed to the spindle of the electric motor 12 is a pinion 13 which drives a toothed wheel $a$. This toothed wheel $a$ engages with a pinion $b$ which is mounted on an axis parallel to the axis of rotation of the toothed wheel $a$ and carries upper and lower cams $c$ and $d$ respectively, these cams $c$ and $d$ being of the same shape but opposite one another (see Figures 1 and 2). Surrounding the cams $c$ and $d$ are cam rings $e$ and $f$ respectively, these cam rings each having sideway extensions $e^1$ and $f^1$ with turned down ends $e^2$ and $f^2$ which are slidably mounted on upper and lower pairs of rods $g$ and $h$ carried by the frame of the projector. The cam rings $e$ and $f$ are thus free to slide backward and forward on the rods $g$ and $h$ and may also rock on the same as and for the purpose hereinafter described. Each of the cam rings $e$ and $f$ is provided with a forward extension $e^3$ and $f^3$ with a down-turned end, these extensions forming the claws and being so referred to hereinafter. These claws $e^3$ and $f^3$ are adapted to engage in the sprocket holes in the film $j$, as hereinafter explained, in order to cause movement of the film, one of the claw members $e^3$ operating to move the film forward one step or picture space, and the other $f^3$ operating to move the film backward.

In accordance with the method described above, the claw $e^3$ engages with the film $j$ twice to move it forward a step each time and then the claw $f^3$ engages with the film to move the same back one step, this sequence of operations being carried out throughout the whole length of the film.

The manner in which this selective operation is obtained is as follows; mounted on the toothed wheel $a$ is a boss $k$ having upper and lower cam grooves $k^1$ and $k^2$. The rearward ends of the cam rings $e$ and $f$ engage with the cam grooves $k^1$ and $k^2$ respectively, being bent slightly, if necessary, and also being of reduced thickness at the rear end to facilitate the operation.

The gear ratio $a$ and $b$ is 1 to 3 and hence the pinion $b$ and cams $c$ and $d$ rotate three times for every rotation of the toothed wheel $a$. One rotation of the toothed wheel $a$ is necessary to complete one cycle of operations. The cam groove $k^1$ is provided with two cam projections, (one of which can be seen at $k^3$) spaced 120° apart around the groove, and the cam groove $k^2$ is provided with a single cam projection $k^4$ which is spaced 120° apart from each of the projections in the cam groove $k^1$. The cam projections $k^3$ and $k^4$ are thus equally spaced around the periphery of the boss $k$.

The cam projections are as shown on the lower side of the cam grooves and function to raise the rear ends of the cam rings $e$ and $f$, the cam rings being free to rock on the rods $g$ and $h$ respectively. These cam projections thus cause the claws $e^3$ and $f^3$ to be depressed in the correct sequence to engage the film. The disposition of the cam projections $k^3$ and $k^4$ will, of course, cause the claw $e^3$ to be depressed twice, the claw $f^3$ once and so on.

Figure 10:
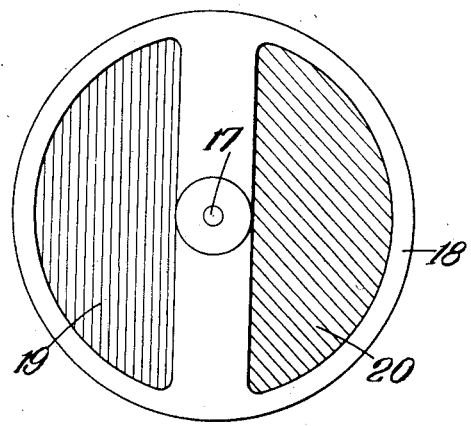
Figure 10 is a front elevation of the color filter.

The shaft 14 of the wheel $a$ extends forwardly as shown in Figure 9, and outside the projector casing 11 is provided with a gear wheel 15 which meshes with a further gear wheel 16 to the spindle 17 of which is attached the rotary filter carrier 18. This filter carrier 18 is provided with two filter sections 19 and 20 colored red and green respectively, as shown in Figure 10. The gear ratio 15, 16 is 2 to 3 so that the filter disc 18 is revolved three times for every two rotations of the shaft 14. Hence, since the toothed wheel $a$ is attached to the shaft 14 and also gears with the pinion $b$ so that the pinion revolves three times for every rotation of the toothed wheel $a$, the filter carrier revolves once for every two rotations of the pinion $b$ and consequently once for every two movements of the film.

21 (Figure 9) is the shutter which, as shown, is mounted on top of the cam $c$ and is adapted to be interposed between the source of illumination 22 and the film. The shutter 21 is approximately semi-circular in shape so that no projection takes place while the film is being moved. The manner in which this obscuration takes place will be more fully described hereinafter.

Figure 8:
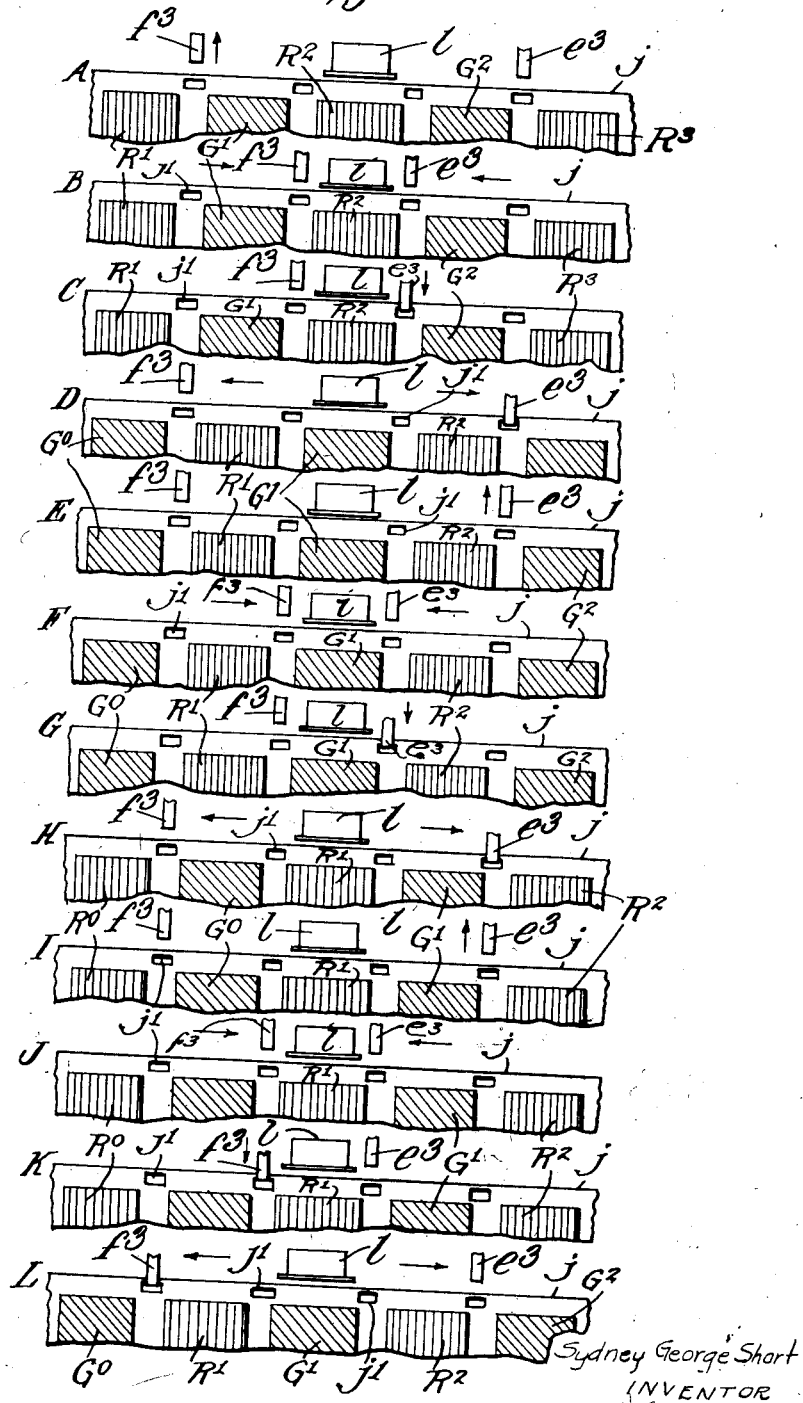
Figures 8A to 8L are diagrammatic views illustrating the various positions of the claw members and also showing the manner in which they operate the film.

Describing now the sequence of operations and referring more particularly to Figures 8A to 8L, with the claws $e^3$ and $f^3$ in the position shown in Figure 8A, which corresponds to the position shown in Figure 1, the film $j$ is free, and a picture is being projected through one color filter, say, red. In this position the shutter 21 is not interposed between the source of illumination 32 and the film $j$; upon a half turn of the pinion $b$, the cams $c$ and $d$ rotate to bring the cam rings $e$ and $f$ to the position shown in Figure 2, and the claws $e^3$ and $f^3$ to the position shown in Figure 8B in which both claws $e^3$ and $f^3$ are moved inwards and are now disposed over the inner sprocket holes $j^1$ in the film $j$. One of the cam projections $k^3$ in the cam groove comes into operation to rock the cam ring $e$ on the rods $g$ and so depress the claw $e^3$ to cause it to be inserted into one of the sprocket holes $j^1$ (see Figure 8C). Rotation of the cams $c$ and $d$ continues and the cam projection $k^3$ operates to maintain the claw $e^3$ in its sprocket hole $j^1$ during the next half rotation of the pinion $b$. The film is, therefore, moved forward one step to the position shown in Figure 8D the positions of the shutter 21 on the upper cam $e$ will, it will be understood, cause the shutter to obscure the light during this operation. The cam projection in the groove $k^1$ then raises the claw $e^3$ clear of the sprocket hole $j^1$ (Figure 8E) and the parts assume once again the position of Figure 1.

Continued rotation of the toothed wheel $a$ through a further third of a turn causes the above sequence of operations to be repeated, see Figures 8F, G, H and I but due to the half revolution through which the filter carrier 18 has moved, the complementary filter (green) will be disposed in front of the lens while the picture space is being projected. The shutter, of course, operates in the above described manner to obscure the source of illumination while the film is being moved. The film has therefore at this stage been moved forward two steps.

Further rotation of the toothed wheel $a$ to complete its rotation will cause the cams $c$ and $d$ to operate as before, but during this period the cam groove $k^1$ no longer causes depression of the claw $e^3$ to engage the sprocket hole; it operates to keep the claw $e^3$ clear of the sprocket hole (see Figures 8J to L). The cam groove $k^2$, however, during this period operates to rock the cam ring $f$ on the rods $h$ and so depress the claw $f^3$ and engage the same with a sprocket hole. While the claw $f^3$ is engaged, however, the same moves in the opposite direction to that in which the claw $e^3$ moved when it was engaged with the film $j$, and consequently the film, instead of being advanced one step, is moved backward one step, see Figures 8K and L the shutter, of course, prevents projection during the movement of the film and due to the continued rotation of the toothed wheel $a$ and the gearing between the shaft 14 and the filter device 18, it will be seen that during the projection on this period of movement the appropriate filter (red) is interposed in the path of the light. From the position of Figure 8L, the claw $f^3$ is raised, and the position of Figure 8A, which is the commencement of the cycle of operations, is obtained. Thus, the net movement of the film for the whole cycle of operations is, therefore, one step forward. The shutter of the projector is so arranged that the gate O (Figures 1 and 2) is obscured during that period that movement of the film is taking place. While the film remains stationary, however, the picture space in the gate is projected. $l$ represents the gate in the whole of the series of Figures 8A to L, and it will be seen that each picture frame will be projected three times. Furthermore, due to the gearing between the shaft 14 and the filter disc 18, it will be seen that the correct color sequence will be maintained, the red color component always being projected through a red filter, and the green color component through a green filter. The actual colors displayed on the screen will, however, alternate, red, green, red, green, and so on.

In other words, the sequence of operation, which is completed as regards each frame within the period normally occupied by the projection of a single frame, is thus as follows; with one frame in the gate, say a red frame, the projection takes place. Then, as the shutter obscures the light, the second mentioned claw engages with the film to retract it one step. The projection of the preceding green frame takes place and then the film is advanced one step by the first first mentioned claw, re-exhibiting the first red frame for the second time. The film is then advanced again by the first mentioned claw, with the result that a second green frame, following the red frame, is projected. The film is then retracted once more by the second mentioned claw, and the original red frame projected for the third time, after which the second green frame is projected for the second time, and so on. The correct sequence of colors, red, green, red, green, is thus maintained, but a considerably higher rate of projection of the frames, in fact three times as fast, is obtained without altering the rate or the natural appearance of the movement of any object portrayed on the film.

In addition to the above mechanism, I provide means for accurately locating the picture space in the gate. Said means comprise a frame $m$, see Figures 1, 2 and 3, which is pivoted on the lower rods $h$. This frame is, at its rear end, provided with a pin $m^1$ engaging with a stepped disc $n$ secured to or forming part of the toothed wheel $a$. The disc $n$ is provided with three steps $n^1$, and the pin $m^1$ is kept in contact with the disc $n$ by means of springs $m^4$ connected to the frame $m$. It will thus be seen that at each rotation of the toothed wheel $a$ the pin $m^1$ will drop down a step $n^1$ three times, and each of these moments is arranged to synchronize with the time at which the movement of the film $j$ by the claw $e^3$ or the claw $f^3$ has been completed. The frame $m$ is provided with a forwardly extending arm $m^2$ having a tapered tooth $m^3$ which, when the frame $m$ is rocked, is adapted to rise and engage with one of the sprocket holes. The tapered tooth $m^3$ takes up any slight inaccuracy in the setting of the film $j$ and thereby accurately locates the picture space in the gate even if it should not have been quite accurately located by the claws $e^3$ and $f^3$. This will enable shrinkage of the film to be compensated for.

This invention may be used in all kinds of color cinematography and will not require any substantial modification of the projector mechanism. The camera, of course, requires no modification for the taking of the films.

Color screens may be provided for the camera and projector in any known manner, in order to give the desired definition and color values to the projected pictures.

Although this invention is more particularly intended for use in color cinematography, the projector may also be used to project black and white films without alteration or detriment.

I claim:—

1. In a cinematographic projector, film feeding mechanism comprising a cam ring, an extension to said cam ring forming a film advancing projection, a cam within said cam ring to cause said film advancing claw to be reciprocated, a further cam ring, an extension on said further cam ring to form a film retracting claw, a cam within said further cam ring to cause reciprocation of said film retracting claw, means for rotating said cams, a rotary member, having thereon cam grooves each engaging with one of said cam rings to cause the film advancing claw or the film retracting claw to be engaged with the film in the desired sequence.

2. In a cinematographic projector, film feeding mechanism comprising a pivoted cam ring, an extension to said pivoted cam ring forming a film advancing claw, a cam within said pivoted cam ring to cause said film advancing claw to be reciprocated, a further pivoted cam ring, an extension on said further pivoted cam ring to form a film retracting claw, a cam within said further pivoted cam ring to cause reciprocation of said film retracting claw, means for rotating said cams, a rotary member, having thereon cam grooves each engaging with one of said pivoted cam rings to cause the film advancing claw or the film retracting claw to be engaged with the film in the desired sequence.

3. In a cinematographic projector, film feeding mechanism comprising a cam ring, an extension to said cam ring forming a film advancing projection, a cam within said cam ring to cause said film advancing claw to be reciprocated, a further cam ring, an extension on said further cam ring to form a film retracting claw, a cam within said further cam ring to cause reciprocation of said film retracting claw, means for rotating said cams, a rotary member, having thereon cam grooves each engaging with one of said cam rings to cause the film advancing claw or the film retracting claw to be engaged with the film in the desired sequence, and means for locating the film in the correct position in the gate.

4. In a cinematographic projector, film feeding mechanism comprising a cam ring, an extension to said cam ring forming a film advancing projection, a cam within said cam ring to cause said film advancing claw to be reciprocated, a further cam ring, an extension on said further cam ring to form a film retracting claw, a cam within said further cam ring to cause reciprocation of said film retracting claw, means for rotating said cams, a rotary member, having thereon cam grooves each engaging with one of said cam rings to cause the film advancing claw or the film retracting claw to be engaged with the film in the desired sequence, a frame pivoted in said projector, an arm adapted to engage with the film to locate the same, and means for causing said arm to be brought into engagement with the film after the film has been moved in order to locate the film.

5. In a cinematographic projector, film feeding mechanism comprising a cam ring, an extension to said cam ring forming a film advancing claw, a cam within said cam ring to cause said film advancing claw to be reciprocated, a further cam ring, an extension on said further cam ring to form a film retracting claw, a cam within said further cam ring to cause reciprocation of said film retracting claw, means for rotating said cams, a rotary member, having thereon cam grooves each engaging with one of said cam rings to cause the film advancing claw or the film retracting claw to be engaged with the film in the desired sequence, a frame pivoted in said projector, a pin on said frame, a rotary stepped disc engaged by the pin on said frame to cause said frame to move, spring means for keeping said pin in engagement with said stepped disc, an arm on said frame and a bevelled tooth at the end of said arm adapted to engage with the film to locate the same.

6. In a cinematographic projector, film feeding mechanism comprising a toothed wheel, means for rotating said toothed wheel, a pinion driven by said toothed wheel, upper and lower cams on said pinion, an upper cam ring surrounding and oscillated by said upper cam, side extensions to said cam ring, rods on which said side extensions and hence said cam ring is slidably and pivotally mounted, a forward extension on said upper cam ring forming a film advancing claw, a lower cam ring surrounding and driven by said lower cam, side extensions to said lower cam ring, further rods on which said side extension of said lower cam ring and hence said lower cam ring are slidably and pivotally mounted, a forward extension to said lower cam ring to form a film retracting claw, a boss secured to said toothed wheel, and cam grooves in said boss, each engaging with one of said cam rings in order to cause the film advancing and the film retracting claws to be engaged with the film in the desired sequence.

7. In a cinematographic projector, film feeding mechanism comprising a toothed wheel, means for rotating said toothed wheel, a pinion driven by said toothed wheel, upper and lower cams on said pinion, an upper cam ring surrounding and oscillated by said upper cam, side extensions to said cam ring, rods on which said side extensions and hence said cam ring is slidably and pivotally mounted, a forward extension on said upper cam ring forming a film advancing claw, a lower cam ring surrounding and driven by said lower cam, side extensions to said lower cam ring, further rods on which said side extension of said lower cam ring and hence said lower cam ring are slidably and pivotally mounted, a forward extension to said lower cam ring to form a film retracting claw, a boss secured to said toothed wheel, and cam grooves in said boss, each engaging with one of said cam rings in order to cause the film advancing and the film retracting claws to be engaged with the film in the desired sequence, a frame pivoted in said projector, a pin on said frame, a rotary stepped disc engaged by the pin on said frame to cause said frame to move, spring means for keeping said pin in engagement with said stepped disc, an arm on said frame and a bevelled tooth at the end of said arm adapted to engage with the film to locate the same.

8. In a cinematograph projector for use with film having alternately arranged complementary color component images thereon, a color filter device having two different color filter sections, means for operating said color filter device to bring the filter sections thereof into the path of the light, film feeding mechanism comprising a film advancing claw, means for moving said film advancing claw backwards and forwards a distance equal to one picture space, means for engaging said claw with the film, a film retracting claw, means for moving said film retracting claw backwards and forwards a distance equal to one picture space, means for engaging said film retracting claw with the film and means for causing said claws to function in a cycle consisting of two engagements of the film advancing claw followed by one engagement of the film retracting claw and a shutter to obscure the light, the shutter, filter carrier and film advancing and film retracting means being driven at such a speed that a complete cycle of operations, consisting of two forward movements of the film and one retraction of the film takes place during the period normally occupied by the projection of a single picture space, the shutter speed also being such that the gate is obscured while the film is moving and a projection takes place after each step of movement of the film.

9. In a cinematograph projector for use with film having alternately arranged complementary color component images thereon, a color filter device having two different color filter sections, means for operating said color filter device to bring the filter sections thereof into the path of the light, film feeding mechanism comprising a film advancing claw, means for moving said film advancing claw backwards and forwards a distance equal to one picture space, means for engaging said claw with the film, a film retracting claw, means for moving said film retracting claw backwards and forwards a distance equal to one picture space, means for engaging said film retracting claw with the film and means for causing said claws to function in a cycle consisting of two engagements of the film advancing claw followed by one engagement of the film retracting claw and a shutter to obscure the light, the shutter, filter carrier and film advancing and film retracting means being driven at such a speed that a complete cycle of operations takes place during the period normally occupied by the projection of a single picture space, the shutter speed also being such that the gate is obscured while the film is moving and a projection takes place after each step of movement of the film, and means for locating said film in the gate.

10. In a cinematograph projector for use with film having alternately arranged complementary color component images thereon, a color filter device having two different color filter sections, means for operating said color filter device to bring the filter sections thereof into the path of the light, film feeding mechanism comprising a cam ring, an extension to said cam ring forming a film advancing claw, a cam within said cam ring to cause said film advancing claw to be reciprocated over a distance equal to one picture space, a further cam ring, an extension to said further cam ring forming a film retracting claw, a cam within said further cam ring connected to said other cam and adapted to reciprocate said film retracting claw over a distance equal to one picture space and means for causing said claws to be engaged with the film in a cycle consisting of two engagements of the film advancing claw followed by one engagement of the film retracting claw and a shutter to obscure the light, the shutter, filter carrier and film advancing and film retracting cams being driven at such a speed that a complete cycle of operations consisting of two forward movements of the film and one retraction of the film takes place during the period normally occupied by the projection of a single picture space, the shutter speed also being such that the gate is obscured while the film is moving and a projection takes place after each step of movement of the film.

11. In a cinematograph projector for use with film having alternately arranged complementary color component images thereon, a color filter device having two different color filter sections, means for operating said color filter device to bring the filter sections thereof into the path of the light, film feeding mechanism comprising a pivoted cam ring, an extension to said pivoted cam ring forming a film advancing claw, a cam within said cam ring to cause said film advancing claw to be reciprocated over a distance equal to one picture space, a further pivoted cam ring, an extension to said further cam ring forming a film retracting claw, a cam within said cam ring connected to said other cam and adapted to reciprocate said film advancing claw over a distance equal to one picture space and means for causing said claws to be engaged with the film in a cycle consisting of two engagements of the film advancing claw followed by one engagement of the film retracting claw, and a shutter to obscure the light, the shutter, filter carrier and film advancing and film retracting cams being driven at such a speed that a complete cycle of operations consisting of two forward movements of the film and one retraction of the film takes place during the period normally occupied by the projection of a single picture space, the shutter speed also being such that the gate is obscured while the film is moving and a projection takes place after each step of movement of the film.

SYDNEY GEORGE SHORT.